United States Patent [19]
Navratil et al.

[11] Patent Number: 4,663,367
[45] Date of Patent: May 5, 1987

[54] COMPOSITIONS AND METHODS FOR REDUCING THE PERMEABILITY OF UNDERGROUND STRATA

[75] Inventors: Martin Navratil, West Hill; Mark S. Mitchell, London; Mojmir Sovak, Toronto, all of Canada

[73] Assignee: The Borden Company Limited, West Hill, Canada

[21] Appl. No.: 703,201

[22] Filed: Feb. 19, 1985

[30] Foreign Application Priority Data

Aug. 30, 1984 [CA] Canada .................................. 462127

[51] Int. Cl.$^4$ ...................... C08L 99/00; C09K 17/00; E02B 3/12
[52] U.S. Cl. .................................... 523/130; 524/596; 524/598; 527/400; 527/403; 166/295
[58] Field of Search ................ 527/400, 403; 523/130, 523/131, 132

[56] References Cited

U.S. PATENT DOCUMENTS 4,246,124  1/1981  Swanson ........................ 252/8.55 R

FOREIGN PATENT DOCUMENTS

| 2938337 | 4/1981 | Fed. Rep. of Germany ...... 527/400 |
| 3123999 | 1/1983 | Fed. Rep. of Germany ...... 527/400 |
| 502718 | 3/1939 | United Kingdom ................ 527/400 |
| 277158 | 12/1970 | U.S.S.R. ............................. 527/400 |

*Primary Examiner*—C. Warren Ivy
*Attorney, Agent, or Firm*—Robbins & Laramie

[57] ABSTRACT

Compositions and methods are used for reducing the permeability of high fluid permeability segments of underground strata, the compositions being injected into the high permeability segments in liquid form and there gelled to reduce the permeability of the segments. A first group of compositions has a pH of at least 4 and comprises a sulfited derivative of a tannin extract together with furfural, formaldehyde or a formaldehyde derivative. The second group of compositions comprises furfural and a gellable vegetable material which can be a tannin extract, a sulfited derivative of a tannin extract, a catechin, an alkaline extract of a coniferous bark or a lignin or sulfonated lignin derivative.

16 Claims, 9 Drawing Figures

COMPOSITIONS AND METHODS FOR REDUCING THE PERMEABILITY OF UNDERGROUND STRATA

BACKGROUND OF THE INVENTION

The invention relates to compositions and methods for reducing the permeability of underground strata during secondary recovery of oil.

When an oil well is first drilled, oil will often flow from the well under the natural pressure existing in oil-bearing stratum. When this natural pressure becomes insufficient, further quantities of oil may be recovered from the well by a mechanical pump. However, it is well known to those skilled in the art that even when no more oil can be recovered from the well simply by mechanical pumping, large quantities of oil often still remain in the oil-bearing stratum, especially if the oil is a heavy, viscous type of crude oil. To recover at least part of this residual oil, which will not flow naturally to the bottom of an oil well penetrating the oil-bearing stratum, so-called "secondary" recovery techniques have been developed. In such secondary recovery techniques, a flooding liquid (which may be, for example, water, brine, an aqueous solution of a polymer, an aqueous solution of a surfactant or a hydrocarbon fluid) is pumped down an injector well. The flooding liquid flows from the injector well through the oil-bearing stratum and forces at least part of the residual oil into a producer well. In some cases, it is advantageous to inject steam down the injector well since the resultant heating of the oil-bearing stratum reduces the viscosity of the oil present therein and assists flow of the oil to the producer well. Steam is also employed in a so-called "steam stimulation" or "huff-and-puff" technique, in which steam is injected for a prolonged period down a single well until the oil-bearing stratum is heated and pressurized, and thereafter the injection of steam is discontinued and an oil/water mixture allowed to flow out of the same well by which the steam was injected.

Unfortunately, various segments within formations containing oil-bearing strata often differ greatly in fluid permeability. Fractures frequently occur within oil-bearing strata either naturally occuring or due to fracturing which is normally effected near the bottom of a producer well in order to assist oil flow during the initial phase of oil recovery. In addition, there may be naturally occurring segments or streaks of high permeability present in the oil-bearing strata, such as segments of loosely-packed sand. When such high permeability segments are present, flow of flooding fluid occurs preferentially along these segments and therefore, after a short period of flooding, almost all of the liquid recovered from the producer well will comprise flooding fluid with only small proportions of oil. Thus, fluid handling facilities have to be increased while significant amounts of displaceable oil in segments of low fluid permeability are by-passed. The poor sweep efficiencies induced by the unfavorable flow through segments of high fluid permeability have thus greatly inhibited the efficiency of secondary recovery processes.

In addition to the aforementioned problems caused by high fluid permeability segments in the oil-bearing strata themselves, difficulties can be caused by high permeability segments lying outside the oil-bearing strata but within the same formation. In particular, water-bearing segments can cause problems during recovery of oil by the aforementioned huff-and-puff technique. If an oil-bearing stratum contained a very viscous crude oil requiring steam extraction is disposed adjacent a water-saturated layer, a large proportion of the steam injected may be absorbed by the water-saturated layer rather than by the oil-bearing stratum, and this absorption of steam by the water-saturated layer in effect wastes the steam and results in very low proportions of oil in the oil/water mixture recovered by the huff-and-puff technique.

U.S. Pat. No. 3,897,827, issued Aug. 5, 1975 to Felber et al, describes a gel forming solution consisting of a dichromate activator and a lignosulfonate solution containing an alkali metal or alkaline earth metal halide.

U.S. Pat. No. 3,583,586, issued June 8, 1971 to Stratton, describes a plugging solution containing an ethoxylated condensation produce of a phenol and formaldehyde.

U.S. Pat. No. 4,074,757, issued Feb. 21, 1978 to Felber et al, describes gelation of solutions containing sodium or ammonium lignosulfonate in fresh water or brine at temperatures greater than 250° F. (120° C.) without the addition of any other gelation-promoting agents. Similarly, Canadian patent No. 1,041,900 issued Dec. 7, 1978 (and U.S. Pat. No. 3,987,827) describes gelation of lignosulfonate solutions containing 2-20 percent reducing sugars at 250° F. (120° C.) and the use of such lignosulfonate solutions as diverting agents in strata undergoing steam flooding.

U.S. Pat. No. 4,091,868, issued May 30, 1978 to Kozlowski et al, describes processes for plugging oil producing formations using compositions containing a pre-catalyzed resin which sets to a water-impermeable gel: the preferred resin for use in this process is a polyphenolic-paraformaldehyde resin.

U.S. Pat. No. 4,275,789, issued June 30, 1981 to Felber et al, describes the use of solutions containing lignosulfonate and sodium silicate, having total solids contents of from 2 to 10 percent by weight and silicate:-lignosulfonate weight ratios of 0.2 to 1, to selectively plug high permeability zones in strata.

U.S. Pat. No. 4,212,747, issued July 15, 1980 to Swanson, proposes as a plugging solution a shear thickening polymer composition containing a high molecular weight polyalkylene oxide polymer with phenol/aldehyde resin, the composition being alkaline.

In attempting to overcome the aforementioned problems caused by high fluid permeability segments within the formation containing the oil-bearing stratum, it is known to inject into the formation solutions which at least partially plug the high fluid permeability segments, thereby greatly decreasing the permeability of these segments so that flooding fluid injected thereafter is forced to traverse other segments in the oil-bearing stratum, or is prevented from entering the water-saturated stratum, thus leading to increased recovery. When separate producer and injector wells are used, the liquids used to plug the high permeability segments are usually injected via the injector well, but may also be injected via the producer well if necessary. For example, U.S. Pat. No. 3,396,790, issued Aug. 13, 1968 to Eaton, proposes a method of plugging high fluid permeability segments in which water is first injected into a well at a high rate, then a viscous solution comprising sodium silicate, polyacrylamide and water is injected. After the injection of the viscous solution, water is again injected at a high rate and under high pressure, followed by injection of a less viscous solution containing ferrous sulfate and water. By carefully controlling the pressure and injection rates of the viscous and ferrous sulfate solutions, the two solutions react together to form plugs in the high permeability segments.

U.S. Pat. No. 3,749,172, issued July 31, 1973 to Hessert et al, proposes a similar procedure for plugging high permeability segments, but in which the plugging solution contains a polymeric gel.

U.S. Pat. No. 3,882,938, issued May 13, 1975 to Bernard describes a plugging technique involving the injection into the oil-bearing stratum of one or more aqueous solutions of reagents that react within the oil-bearing stratum to form a silicate and a gelling agent such as an acid, an ammonium salt, a lower aldehyde, a polyvalent metal salt or an alkali metal aluminate.

U.S. Pat. No. 4,246,124, issued Jan. 20, 1981 to Swanson, describes an aqueous plugging solution containing a water-dispersible polymer, an aldehyde and a phenolic compound, which may either be a simple phenol or a tannin such as quebracho or sulfomethylated quebracho.

The wide variety of operating conditions encountered during enhanced recovery of oil, which are due in no small part to the highly diversified physical and chemical character of oil deposits in North America and throughout the world, dictate that any composition for plugging segments of high fluid permeability within formations containing oil-bearing strata meet numerous operating requirements. A principal requirement of an effective plugging solution is that its reactivity be sufficiently controllable to plug the high permeability segments in an operationally-feasible gel time over the wide temperature ranges routinely encountered during various conventional recovery procedures. These temperatures may range from 10° to 250° C. Once formed, the gel should also be resistant to all conventional flooding liquids, some of which may be used at elevated temperatures, and to steam injected to recover viscous oil from the oil-bearing stratum; this steam may be superheated to temperatures of at least 315° C. or more. In order that the plugging solution may be pumped down a deep well by which it is injected and for a considerable distance thereafter into the high fluid permeability segment, the plugging solution should have a low viscosity when first formulated and should remain of low viscosity for an extended period of time (which may vary from several hours to several weeks) to allow its flow into the high fluid permeability segment. Thereafter, the plugging solution should rapidly gel to give a gel of high mechanical strength. It is particularly desirable to have plugging solutions which can be tailored by the operator by (1) selection of a particular agent which gives optimum performance over the anticipated operating temperature range and (2) by varying the relative amounts of the components in the plugging solution to give a desired time lag before gelling of the solution occurs. It is also sometimes desirable to produce only a reduction in permeability of the high permeability segments and therefore the operator should be able to control the composition of the plugging solution in such a manner as to allow only partial plugging of the high permeability zones. In addition, the plugging solution should not be affected by shear forces to which it is often subjected during pumping into porous high fluid permeability segments.

The plugging solution should, of course, also not be adversely affected by various conditions which may be present within the high fluid permeability segment. Since the high permeability segments to be plugged are often still wet with oil, the plugging solution must be able to gel in the presence of residual oil, especially in the presence of oil-wet sandstone often encountered in oil-bearing strata, and the gel must be stable in the presence of such oil. Also, many oil-bearing strata, or water-saturated layers present adjacent oil-bearing strata, contain brine of various concentrations, and accordingly, the plugging solution should be able to gel in the presence of brine and the formed gel should not deteriorate during prolonged exposure to brine.

Not only should the plugging solution be resistant to the effects of, and able to gel in the presence of, brine within the high fluid permeability segments to be plugged, but from a practical point of view it is important that the components of the plugging solution be such that the solution can be made up using brackish water or brine. For obvious economic reasons, plugging solutions are normally aqueous and many oil wells are located in remote areas. In order to avoid shipping tons of fresh water to such remote sites, it is obviously highly desirable that one be able to make up the plugging solution using whatever water is available at the drilling site, and frequently the only large sources of water which are available are either brackish, or comprise the brine which has previously been removed from the well, when the drilling site is on land. In many cases today, the drilling site may be off-shore, where the problem of transporting large quantities of fresh water to the drilling site is of course exacerbated under offshore conditions where the only large readily available source of water is seawater. Thus, it is desirable that a gelling solution have the capability to be made up using either brine or seawater as the aqueous medium.

Prior art plugging solutions have not been successful in meeting all of the stringent operational requirements discussed above. Many prior art plugging solutions have been so viscous that it is difficult to pump them with sufficient speed to penetrate deeply into the high permeability segments prior to gelling. This susceptibility for at least partial premature gelling has made control of the time delay before gelling occurs extremely difficult and could result in plugging of the well by which the plugging solution was being injected. Moreover, many prior art plugging solutions, especially those based on high molecular weight polymers which are subject to physical degradation by pumping shear forces, have been found to produce insufficient mechanical strength in the gel and have often exhibited poor gel performance in the presence of brine and residual oil. Hitherto, no prior art plugging solution has provided a method for controlling the rate of gellation of the plugging and solution employed which is effective over the whole temperature range which may be encountered in the field, even when the plugging solution is formulated using brine and/or sea water as the aqueous base. Furthermore, many prior art plugging solutions are greatly affected by the pH conditions under which they are required to gel within the high fluid permeability segment. Ideally, a plugging solution should perform in the same manner irrespective of the pH of the solution. More realistically, a plugging solution should not be unduly susceptible to pH and should be able to perform in a predictable manner over a wide pH range, including parts of both the acidic and basic ranges, in order that the plugging solution can be used under a broad range of reservoir conditions without undue variations in its properties.

Our co-pending applications Ser. Nos. 397,452 and 590,034 filed July 12, 1982 and Mar. 15, 1984 respectively (both now abandoned) disclose plugging solutions and methods for their use which rely upon cross-linking of vegetable materials by formaldehyde or derivatives thereof. The compositions disclosed in application Ser. No. 397,452 use as the vegetable material a polyphenolic tannin extract, a catechin or an alkaline extract of a coniferous tree bark, and are intended for use at relatively low temperatures, typically no higher than about 65° C. The compositions disclosed in application Ser. No. 590,034 use as the vegetable material a lignin extract derived as a by-product of the separation of cellulosics from ligninous material in the pulping process of manufacturing paper products, and are primarily intended for use at somewhat higher temperatures, up to about 150° C. The plugging solutions described in these co-pending applications are more successful than previous prior art compositions in overcoming most of the problems discussed above. In particular, these plugging solutions will gel in the presence of relatively high concentrations of dissolved salts, and can thus be used in underground strata which contain brines. However, although the two aforementioned co-pending applications do suggest that the plugging solutions disclosed therein may be formulated using water containing dissolved salts, the plugging solutions disclosed in these two pending applications are not well suited for formulation with brines such as seawater. Although the plugging solutions will gel in the presence of concentrations or brine up to about that of seawater, the pH of the plugging solution is sufficiently high (at least 9) that the presence of any significant concentrations of calcium and magnesium cations in the plugging solution causes precipitation of calcium and magnesium hydroxide into the solution. Thus, if one attempts to formulate these plugging solutions using brine or seawater, precipitation of calcium and magnesium hydroxides will occur as soon as the plugging solution is formulated, and the plugging solution entering the well by which it is to be injected into the underground strata will be a heterogeneous, two-phase system comprising the metal hydroxide suspended in a liquid solution. As is well known to those skilled in the art, it is undesirable to have precipitates present in plugging solutions prior to injection (even though such precipitates will not prevent gelling of the plugging solution), since, for example, the presence of the precipitates in the solution may cause difficulties as the plugging solution is forced through porous strata to the location where it is intended to gel.

There is thus a need for compositions and methods for plugging high fluid permeability segments in formations containing oil-bearing strata, which compositions and methods can be used in segments over a temperature range of about 10°-250° C., which permit the solutions employed to be made up in brines or seawater without causing formation of precipitates in the plugging solution prior to its injection into the strata, and which produce gels stable at temperatures up to 300° C. This invention seeks to provide such composition and methods.

SUMMARY OF THE INVENTION

This invention provides methods for decreasing the fluid permeability of a segment of a formation containing an oil-bearing stratum, this segment having greater fluid permeability than the surrounding segments of the formation. In the instant methods there is injected into the formation, via a well penetrating this formation, an aqueous plugging solution, the gelling time of the solution and the rate of injection thereof being such that the solution passes down the well by which it is injected and achieves substantial penetration into the high fluid permeability segment before substantial gelling of the solution occurs. Thereafter, the solution is allowed to gel within the high fluid permeability segment and thereby reduce the fluid permeability of this segment. In the first instant method, the aqueous solution has a pH of at least about 4 and comprises a sulfited derivative of the tannin extract and an aldehyde component. This aldehyde component can be furfural, urea-formaldehyde concentrate, hexamethylenetetramine, paraformaldehyde, formaldehyde in aqueous solution or a phenol-formaldehyde resole resin, and the total weight of the sulfited tannin derivative and the aldehyde component is from about 1 to about 20 percent by weight of the solution.

This invention also provides a first composition for use in the first instant method, this composition being an aqueous gellable solution having a pH of at least about 4 and comprising a sulfited derivative of a tannin extract and an aldehyde component, this aldehyde component being any of the aldehyde or aldehyde derivatives already mentioned. The total weight of the sulfited tannin extract in the aldehyde component is from about 1 to about 20 percent by weight of the solution.

As already mentioned, the aldehyde component used in the first instant method and composition may be furfural. The use of aldehydes as cross-linking agents for cross-linking vegetable materials in gellable plugging solutions has previously been suggested; see for example the aforementioned U.S. Pat. No. 4,019,868 to Kozlowski et al. However, hitherto the aldehyde employed has been formaldehyde or a derivative or polymer thereof and there has been no suggestion that furfural might be substituted for formaldehyde in such application. As discussed above, plugging solutions and methods for their use which rely upon cross-linking of vegetable materials by formaldehyde derivatives and polymers are described and claimed in our copending applications Ser. Nos. 387,452 and 590,034. The disclosures of both these copending applications are herein incorporated by reference. This invention extends to compositions and methods similar to those described and claimed in these two copending applications, but using furfural instead of formaldehyde or formaldehyde derivatives or polymers as the aldehyde cross-linking agent.

Accordingly, this invention provides a second method for adjusting the fluid permeability of a segment of a formation containing an oil-bearing stratum. This method uses the same techniques for injecting an aqueous plugging solution as the first instant method, but in the second instant method the aqueous solution is an aqueous, alkaline gellable solution comprising an alkaline material, furfural and a polyphenolic vegetable material, which can be a tannin extract, a catechin or an alkaline extract of a coniferous tree bark. The alkaline gellable solution has a pH of at least about 9.5 and the total active solids content of the solution is from about 1 to about 33 percent by weight of the solution.

As more fully explained in the aforementioned copending application Ser. No. 06/613,897, now abandoned, the aqueous alkaline gellable solutions used in the second instant method may optionally contain sodium chloride. The presence of sodium chloride in the gellable solutions significantly affects their gel times and thus, although sodium chloride is not a reactant in the gel-forming reaction, it is an active component in determining the gel times of the solutions. Accordingly, the term "total active solids content" is used herein in the same sense as in the aforementioned application Ser. No. 06/613,897 to refer to the total content of alkaline material, polyphenolic vegetable material, furfural and sodium chloride (if any) in the gellable solutions. The solutions used in the second instant method may also contain various minor additives, such as preservatives and anti-dusting agents, but these additional minor additives have no significant effect on the gel time of the solutions and are thus excluded when calculating the total active solids content of the solutions.

This invention also provides a third method of decreasing the fluid permeability of a segment of a formation containing an oil-bearing stratum, this third method also involving the injection into the formation of an aqueous gellable solution by the same techniques as in the first two instant methods. However, in the third instant method the aqueous solution has a pH of at least about 9.0 and comprises an alkaline material, a lignin extract derived as a by-product of the separation of cellulosics from ligninous material in the pulping process of manufacturing paper products, and furfural. The total weight of the alkaline material, lignin extract and furfural is from about 5 to about 30 percent by weight of the solution.

The invention also provides a fourth method for decreasing the fluid permeability of a segment of a formation containing an oil-bearing stratum, which method again involves injection of an aqueous gellable solution into the formation by the same techniques as in the first three instant methods. However, in the fourth instant method the aqueous gellable solution has a pH of about 2 to about 11 and comprises an aqueous soluble sulfonated derivative of lignin derived as a by-product of the pulp and paper industry separation of ligninous material from the cellulosics used in the manufacture of paper products, and furfural. The total weight of the sulfonated derivative and the furfural is from about 3 to about 15 percent by weight of the solution.

Finally, this invention provides a second instant composition for use in reducing the permeability of high permeability segments of strata by any of the four instant methods. This second instant composition comprises furfural and a vegetable material capable of being gelled in aqueous solution by furfural. This vegetable material can be a tannin extract, a sulfited derivative of a tannin extract, a catechin, an alkaline extract of a coniferous tree bark, a lignin extract derived as by-product of the separation of cellulosics from ligninous material in the pulping process or manufacturing paper products, or a soluble sulfonated derivative of lignin derived as a by-product of the pulp and paper industry separation of ligninous material from the cellulosics used in the manufacture of paper products.

DETAILED DESCRIPTION OF THE INVENTION

Figure 1:
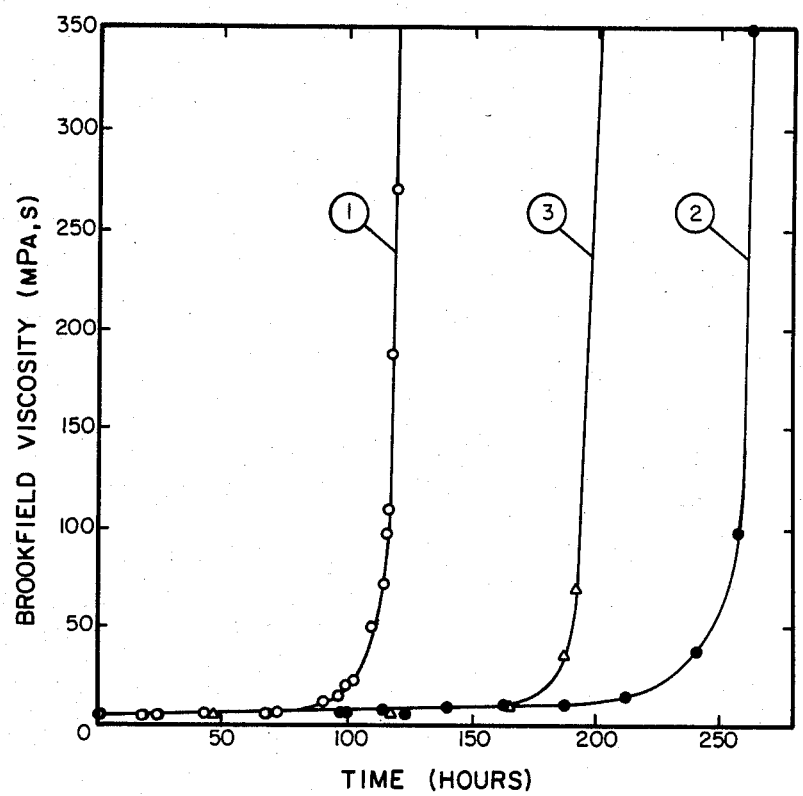
FIG. 1 shows graphs of viscosity against temperature for gellable aqueous solutions containing various concentrations of sulfited mimosa tannin extract and formaldehyde.

The first instant compositions, comprising a sulfited derivative of a tannin extract and an aldehyde component, are usable at temperatures over the range of about 10° C. to about 250° C. As explained below, by appropriate selection of the method of preparation of the sulfited derivative, the first instant compositions can be made to tolerate up to magnesium and calcium cations up to a total of about 2,000 parts per million without formation of precipitates, and thus the first instant compositions can be made up using brine or seawater as the aqueous medium. The preferred pH range for the first instant compositions is from about 4 to about 11.

The tannin extract which is used in the first instant composition can be mimosa, quebracho, mangrove or wattle, or can be a vegetable tannin such as those extracted from *Eucalyptus crebra, Callitris calcarata* or *Colletris gluaca*. The preferred tannin extracts for use in the first instant composition are mimosa tannin extract and quebracho tannin extract, the former being especially preferred. Mimosa tannin extract, which is readily available in commerce, is extracted from *Acacia mearnsii* (formerly known as *A. mollissima*).

The exact chemical composition of many of the commercially available tannin extracts is not known, but these materials are known to possess three properties necessary for use in the first instant compositions, namely solubility at the appropriate pH range, ability to combine with formaldehyde or other aldehydes, and ability to form gels with such aldehydes. The ability of the materials to combine with formaldehyde is conveniently measured and the number of grams of formaldehyde which react in four hours with 100 grams of the dry tannin extract dissolved in an aqueous solution of ph 9.5. We prefer to use tannin extracts having a formaldehyde combining capacity of at least 5.0.

Before being used in the first instant composition and method, the tannin extracts are sulfited, that is to say treated so that sulfonate ($SO_3$) groups are attached to the tannin extract molecules. The preferred method for attaching the sulfonate groups to the tannin extract is to treat the tannin extract with an alkali metal sulfite. Preferably from about 5 to about 20 parts by weight of the alkali metal sulfite are used per 100 parts by weight of the tannin extract, on a dry basis. (As those experienced in this field will be aware, tannin extracts may be sold commercially either in the form of dry powders or aqueous solutions. Herein, when reference is made to any ratio of tannin extract to the other components of the instant compositions, reference is always to the dry weight of the tannin extract.) The presently preferred technique for sulfiting of the preferred mimosa tannin extract is to dissolve the mimosa tannin extract in an aqueous solution of sodium hydroxide to produce a solution containing about 4% by weight (relative to the total weight of the solution) of sodium hydroxide and about 40% by weight of mimosa extract. A quantity of sodium sulfite equal to about 10% by weight of the mimosa extract is then added and the solution brough to reflux for 1 to 6 hours. If necessary, the final pH of the resultant sulfited mimosa solution can be adjusted with hydrochloric acid. The sulfited mimosa extract solution can then be used either directly as the liquid concentrate or spray dried to a powder.

The use, in the first instant composition and method, of sulfited tannin extracts has the important advantage of rendering the tannin extracts soluble over a much wider pH range. Previous gellable solutions based on tannin extracts have had to be maintained at a pH of at least about 9 in order to keep the tannin extract in solution, the tannin extract tending to precipitate if the pH fell significantly below 9. The need to keep the pH of the prior art tannin extract based solutions so high has tended to make such solutions incompatible with brines containing divalent cations which form insoluble hydroxides, since such cations precipitate as their insoluble hydroxides around pH 10–11. In contrast, the first instant compositions using sulfited tannin extracts will keep the tannin extract in solution down to about pH 4, the lower pH limit varying somewhat, of course, with the concentration of tannin and the concentration of other ions present in the solution, since the lower pH limit is determined by the solubility product of the tannate salt which precipitates at too low a pH. In the basic pH range, the factor which limits the pH usable with the first instant compositions is the precipitation of insoluble hydroxides of calcium, magnesium or other divalent cations, not the lowering of pH caused by such precipitation, as is the case with prior art unsulfited tannin extract based solutions, since the sulfited tannin will remain in solution despite any change in pH induced by the interaction of multivalent brine cations and hydroxide ions. It should be noted that, if it is desired to formulate the instant compositions using seawater, the pH of the composition should not be higher than about 9.8–10.0, since the concentration of multivalent cations present in seawater will cause precipitation of hydroxides at a higher pH.

Also, as will be apparent to those skilled in the art, the pH of the first instant compositions should be chosen having regard to the nature of the strata into which they are to be injected. In particular, if these strata contain swellable clays or carbonates, the pH and/or cation content of the first instant composition should be chosen so that damage to the formation with consequent decrease in oil recovery is avoided. It is believed that no further discussion of the necessary precautions is required, since such precautions will be routine to those skilled in the art.

It is believed, although the invention is in no way limited by this belief, that the broadening of the pH range at which the sulfited tannin extracts used in the first instant composition are soluble is due to the high solubility imparted to the polyphenolic tannin extract by both the opening of the heterocyclic ring, yielding a hydroxyl group which is hydrophilic, and the introduction into the tannin extract molecule of the sulfonate function, which is also hydrophilic.

As already mentioned, the aldehyde component of the first instant composition may be either furfural or any of various sources of formaldehyde, including urea-formaldehyde concentrate, hexamethylenetetramine, paraformaldehyde, aqueous formaldehyde or a phenol-formaldehyde resole resin In compositions having pH's above about 8, the preferred ldehyde component is paraformaldehyde, since this material is a dry powder which can readily be mixed with the dry sulfited tannin extract to form a single dry mixture which only needs the addition of the appropriate amount of water to form the first instant composition. Paraformaldehyde is also of course, a solid material which is easier to handle and store than liquid solutions of formaldehyde or urea-formaldehyde concentrate. In addition, paraformaldehyde is of course a very concentrated form of formaldehyde and in situations where transport of material to the drilling site may be difficult, paraformaldehyde has the advantage that the total weight of material which must be transported is lower than if, for example, an aqueous solution of formaldehyde or a phenol-formaldehyde resole is used as the aldehyde component. It is preferred that the first instant composition comprise from about 5 to about 20 parts by weight of paraformaldehyde per 100 parts by weight of the sulfited tannin extract on a dry basis.

However, the use of paraformaldehyde as the aldehyde in the instant compositions is not recommended where the pH of the composition is to be below about 8, because under such compositions paraformaldehyde dissolves in water only very slowly, requiring several hours for complete solution, which is impracticably slow. Furthermore, the paraformaldehyde is only effective in causing gelling of the solution after it has dissolved so that if the pH is too low the slow dissolution of the paraformaldehyde will retard gelling of the solution. Thus, when the instant compositions are to be formulated with a relatively low pH, liquid formaldehyde solutions or a urea-formaldehyde concentrates are more satisfactory sources of formaldehyde.

The weight ratio of sulfited tannin extract to aldehyde component which would be used will vary, of course, with both the specific tannin extract and the specific aldehyde employed. When using the sulfited mimosa tannin extract, the weight ratio of mimosa tannin extract to aldehyde is preferably from about 1.5:1 to 7.5:1, with the especially preferred ratios being 5.7:1 for formaldehyde, 1.8:1 for furfural, 7.3:1 for hexamethylenetetramine and 2.5:1 for most phenol-formaldehyde resoles. When the aldehyde component comprises furfural, the furfural is preferably present in an amount from about 40 to about 60 parts by weight of the sulfited tannin extract on a dry basis.

The urea-formaldehyde concentrate which can be used as a source of formaldehyde in the gellable solutions used in the instant methods is commercially available and is manufactured by adsorbing gaseous formaldehyde into an aqueous solution of urea. This urea-formaldehyde concentrate has the advantage that, whereas, simple aqueous solutions of formaldehyde containing more than about 37% formaldehyde are unstable and likely to polymerize, urea-formaldehyde concentrate can contain considerably greater concentrations of formaldehyde and still have long term storage stability.

Using hexamethylenetetramine as the formaldehyde source in the gelable solutions normally produces solutions having longer gel times than similar solutions in which formaldehyde, paraformaldehyde, or a phenyl-formaldehyde resole is used as the source of formaldehyde. Moreover, it appears (although the invention is in no way limited by this belief) that the way in which hexamethylenetetramine produces gelling is somewhat different from that in which formaldehyde, paraformaldehyde, and phenol-formaldehyde resoles produce gelling. Paraformaldehyde is unstable in water and thus, when gelable solutions made up using paraformaldehyde, the paraformaldehyde dissociates to form free formaldehyde in the solution (this free formaldehyde is of course in equilibrium with methylene glycol according to the equation $HCOH + H_2O = HOCH_2OH$). Accordingly, when either formaldehyde or paraformaldehyde is used as the formaldehyde source, the solution as originally formed contains a substantial concentration of formaldehyde and thus, in principle, begins to gel as soon as it is formed although, as illustrated in the the Examples below, no perceptible change in gelling properties takes place for a considerable period. Phenol-formaldehyde resoles do not hydrolyze in the gelable solutions, but in this case the reactive entity responsible for the gelling reaction is the methylol groups of the resole and these reactive groups are present from the formation of the gellable solution. Thus, in all these cases, at least in principle, gelling of the gellable solution begins as soon as this solution is formed.

However, although free formaldehyde produced by hydrolysis appears to be the effective gelling agent in gellable solutions containing hexamethylenetetramine, hexamethylenetetramine is much less labile than paraformaldehyde and the the rate at which hexamethylenetetramine is hydrolyzed to free formaldehyde and ammonia in aqueous solution is very slow at room temperature. For practical purposes, gellable solutions containing hexamethylenetetramine are stable for long periods at room temperature since in the absence of any substantial concentration free formaldehyde almost no gelling reaction takes place. Hydrolysis of the hexamethylenetetramine to formaldehyde and ammonia to an extent sufficient to produce reasonably rapid significant gelling reactions takes place when the gellable solution is raised to a temperature substantially above room temperature, in excess of 40° and preferably more than about 50° C., such as would normally occur when the gellable solution is injected into oil-bearing stratum a substantial distance below ground. Accordingly, unless gel times of the order of several weeks are required the use of gellable solutions containing hexamethylenetetramine is not recommended where the oil-bearing stratum is relatively cool, for example because large quantities of flooding liquid have previously been passed through the stratum. On the other hand, compositions containing hexamethylenetetramine may be highly desirable for use in relatively hot oil-bearing stratum where other gellable solutions might tend to gel so quickly that proper penetration of the gellable solution into the high fluid permeability zone would not be achieved before gelling occured.

For example, experiments were conducted to compare the gel times of the 10% total active solids (in tap water) compositions described in Example 1 of the aforementioned Application Ser. No. 613,897, which is based upon (unsulfited) mimosa tannin extract and paraformaldehyde in a weight ratio of 75.2:13.2, with a precisely similar composition in which the paraformaldehyde was replaced with an equivalent amount (i.e. containing the same amount of formaldehyde) of hexamethylenetetramine. The paraformaldehyde-based composition showed gel times of 15 hours at 20°-25° C., 2 hours at 63° C. and less than 1 hour at 95° C., while the hexamethylenetetramine-based composition had gel times of 1200 hours at 20°-25° C., 40 hours at 63° C. and 8 hours at 95° C. Although the experimental technique was such that the measured gel times were subject to errors of 10-25%, these results do show that the hexamethylenetetramine-based compositions tend to have gel times at room temperature which are too long for most practical purposes, whereas at 95° C. the hexamethylenetetramine-based compositions may have useful gel times, while the gel times of the paraformaldehyde-based compositions at this temperature are too short for most practical purposes.

First instant compositions which use furfural as the aldehyde component tend to have longer gel times than similar compositions in which formaldehyde is used as the aldehyde component. In addition, furfural is of course a liquid, so that any compositions using furfural will of course require that the furfural and the sulfited tannin extract be mixed on site. In addition, furfural is an odorous and unpleasant material to handle and it is also much more expensive than most forms of formaldehyde. Thus, in general the use of furfural as the formaldehyde component is not recommended, although there may be certain applications (for example where the strata are at relatively high temperatures) in which the longer gel time of the furfural-containing compositions is advantageous.

Because it is preferred that the sulfitation of the tannin extract be conducted in an alkaline solution, as described above, the preferred first instant compositions contain an alkali, and this alkali is preferably sodium or potassium hydroxide present in an amount of from about 5 to about 20 parts by weight per 100 parts by weight of the sulfited tannin extract on a dry basis. Naturally, if for the reasons discussed above the presence of such amount of alkali is disadvantageous in a particular application because it tends to raise the pH to too high a value, or for any other reason, the excess alkali can be destroyed by appropriate addition of an acid such as hydrochloric acid.

Also as already indicated, the first instant compositions may contain up to about 0.2% by weight of cations having a valency greater than 1 and forming insoluble hydroxides; certain of the first instant compositions may be able to tolerate even larger quantities of such cations. Thus, the first instant compositions may be formed by dissolving the sulfited tannin extract and the aldehyde component in seawater.

Naturally, the ability of the first instant compositions to tolerate the presence of divalent and other polyvalent cations without formation of precipitates therein not only allows the first instant compositions to be formulated using water containing such cations, but also renders the first instant compositions (if they have been made up with less than the maximum tolerable concentration of such cations) able to gel satisfactory in high permeability zones containing brines such as are often found in oil-bearing and other strata. At least some of the first instant compositions will gel satisfactorily in the presence of up to about 5% of total dissolved salts, depending upon the concentration of the gelable solution. If the gelable solution is made up of water containing little or no dissolved divalent cations, the gelable solution itself will of course dilute the brine present in the reservoir so that in practice the first instant compositions and methods can be used in strata containing brine with considerably more than 5% dissolved salts.

It is often found that, in brine-containing strata which has already been treated with flooding fluids, the concentration of brine is relatively low within the high fluid permeability segments of the stra, since most of the brine has been washed out of the high fluid permeability segments by the flooding fluid used during the first part of the secondary oil recovery process, while the concentration of brine remains relatively high in the segments of lower fluid permeability. In the presence of high concentrations of calcium and magnesium cations such as are usually present in such brines, the gellable solutions used in the first instant method form insoluble particles. Accordingly, when such solutions are injected into strata in which the concentration of brine is much lower within the high fluid permeability segments than within the surrounding segments, the gellable solutions enter the high fluid permeability segments and cause the formation of insoluble material at the interface between the high fluid permeability segments and the surrounding segments, when the gellable solutions come into contact with the brine at suchinterface. The resultant deposition of insoluble material at these interfaces limits the penetration of the gellable solution into the surrounding segments, thereby improving the containment of the gellable solution within the high fluid permeability segments and ensuing that the gellable solution does not substantially invade oil-bearing unswept segments.

If little or no flooding of the high-fluid permeability segments has taken place prior to use of the instant method, fresh water may be injected into the formation before the gellable solution is injected and through the same well or wells to lower the brine concentration within the high fluid permeability segments, thereby ensuring that, when the gellble solution is injected, the gellable solution will be confined to the high fluid permeability segments by formation of the insoluble material as described above.

As is well known to those skilled in the art, although the main salt components in reservoir brines is sodium chloride, the effect of any given concentration of the monovalent sodium cation on the gelling of gellable solutions such as those used in the first instant method is much less than that of the same concentration of divalent cations, such as calcium and magnesiuim, present in the brines. Thus, the presence of (1-2% by weight or even more in some cases) of sodium chloride in the first instant composition is not deleterious, although the presence of sodium chloride in any given composition may considerably reduce its gel time.

The first instant compositions have relatively low viscosities when first prepared, and such viscosities are preferably in the range of from about 1 to about 30 mPa.s depending upon the solids content of the composition and the temperature. These viscosities render the compositions easy to pump down a well and capable of rapid injection into the high-fluid permeability segment. Furthermore, the viscosity of the compositions remains substantially unchanged for a relatively long period, which can be adjusted from several hours to several hundred hours, thus enabling the compositions to be pumped for a protracted period without risk of them gelling in an undesired location. At the end of this time, the viscosity of the compositions increases very rapidly and a gel of substantial mechanical strength is formed. The ability of the first instant compositions to remain non-viscous for protracted periods and then to form a strong gel very rapidly is particularly useful for selective plugging of high fluid permeability segments at some distance from the bottom of the well through which they are injected. Since it is usually desirable to reduce or eliminate the fluid permeability of a high fluid permeability segment lying some distance from the well through which the composition is injected, a non-gellable displacing fluid should normally be injected into the high fluid permeability segment after the composition has been injected and through the same well, thus causing the composition to be displaced from around the well through which it is injected and preventing excessive loss of fluid permeability around the bottom of this well. This displacing fluid used in this procedure may be water or a viscous aqueous solution of a polymer; suitable polymers for forming such viscous aqueous solutions are well known to those skilled in the art.

The gel time of the first instant compositions depends upon a number of factors, including the total solids content of the composition, the exact chemical nature and proportion of the various components in the composition, the temperature of the high fluid permeability segment in which gelling takes place and the quantity of ions which are either deliberately introduced into the composition or which become admixed therewith because of the presence of brines in the high fluid permeability segment. Although, as those skilled in the art are aware, final selection of the various parameters used in the first instant method is to a certain extent dependent upon the skill and judgment of the operator, certain general principles for guidance in selection of these parameters can be set forth. In general, the higher the solids content of the composition, the shorter is the gel time and the lower the final permeability obtained in the originally high fluid permeability segment. Higher temperatures in the environment in which the gelling takes place i.e. in the high fluid permeability zone lower the gel times. Also, the presence of the cations of dissolved salts in the compositions tends to reduce gel times, whether these cations are introduced into the composition during formulation of the composition with a brine or are admixed therewith because of brine present in the formation into which the composition is injected. Indeed, it is an important advantage of the first instant compositions and methods that by controlling the various parameters which affect gel time, the operator can select gel times of from a few hours to several hundred hours over the operating temperature range of 10°–250° C. and is a further advantage of the first instant compositions and methods that they can be used when residual oil is present in the high fluid permeability segments since the presence of such residual oil will not affect the gelling of the compositions.

A further significant advantage of the first instant compositions and methods is that the concentrations of the components of the compositions can be adjusted so as to form gels which do not completely block or destroy the permeability of the originally high fluid permeability segment but only reduce the permeability thereof. This is advantageous since such reduction but not elimination of the permeability of the treated segment eliminates the possibility of inadvertently and completely stopping the flow of flooding fluid, or of the return flow of oil/water mixture during huff-and-puff oil recovery. Such complete stoppage of fluid flow is highly undesirable in some cases since it necessitates the expensive drilling of a new injector well into an unblocked part of the formation or fracturing of the original injector well. To produce such incomplete blocking of the treated segment, it is desirable to use a composition solution in which the total weight of sulfited tannin extract and aldehyde component is in the range of from about 1% to about 5% of the weight of the composition. Care should of course be exercised to ensure that sufficient reduction in the permeability of the originally high fluid permeability segment does take place since using first instant compositions containing as little as 1% total solids may in some cases tend to produce insufficient reductions in permeability.

A further advantage of the first instant compositions and method is that gels formed below pH 7 are substantially free of syneresis, that is to say they exude only a very small amount of water from the gel structure, thereby retaining the original gel volume. Moreover, the first instant compositions and methods produce gels of substantial mechanical strength which can be used for prolonged periods of time at the temperatures typically employed in steam recovery of heavy oil, i.e. temperatures up to about 300° C., with little or no gel deterioration.

Finally, the gels formed from the first instant composition possess an interesting property. When a first instant composition is used to reduce the permeability of a high fluid permeability segment, the permeability to water decreases by a greater percentage than the permeability to oil. This property is of course advantageous in that it tends to enhance the ratio of oil to flooding fluid recovered during subsequent enhanced recovery of oil from the formation including the plugged high fluid permeability segment. This ability to decrease permeability to water more than permeability to oil has previously been observed in certain plugging compositions based upon polyacrylamide gels, but has not previously been reported in plugging solutions of the same chemical type as the first instant compositions.

As indicated above, the first instant compositions and methods are useful for decreasing the fluid permeability of a segment of a formation containing an oil-bearing stratum. These compositions and methods may be used to reduce the permeability of high fluid permeability segments lying both inside the oil-bearing stratum and outside this stratum. Probably the most common use of the first instant compositions and methods will be to treat high fluid permeability zones (e.g. sand streaks and the like) within oil-bearing strata. However, the first instant compositions and methods are useful for treating high fluid permeability segments lying outside oil-bearing strata, and in particular are useful for treating water-bearing segments which may interfere with enhanced recovery of oil from oil-bearing strata, especially where treatment of the oil-bearing stratum is required. For example, if an oil-bearing stratum containing a very viscous crude oil requiring steam stimulation is disposed immediately above a water-saturated layer, resulting in a very high proportion of water in the mixture recovered due to absorption of most of the steam by the water-saturated layer rather than by the oil-bearing stratum, use of the first instant method to form a "pancake" of gelled material within the water-saturated layer and surrounding the injector well may result in a much improved oil:water ratio because substantially all the steam will now enter the oil-bearing stratum rather than being absorbed by the water-saturated layer. Although in most cases the water-bearing layer is below the oil-bearing stratum, those skilled in the art will appreciate that the first instant method can also be used to block water-containing layers, for example quick-sand layers disposed above the oil-bearing strata.

As already indicated, the second, third and fourth instant methods, and the compositions used in these methods are essentially variations of the methods and compositions described in the two aforementioned copending application Ser. Nos. 397,452 and 590,034 with the source of formaldehyde used in the methods described in these copending applications being replaced by furfural. The reader is referred to the text of these copending applications for further details of the techniques and components which should be used in such compositions and methods. However, as already mentioned above in relation to the first instant compositions and methods, the use of furfural tends to produce compositions having considerably longer gel times than similar compositions which use paraformaldehyde or a similar source of formaldehyde as the cross-linking agent. Accordingly, caution should be exercised in replacing formaldehyde with furfural in compositions which already have long gel times since the corresponding furfural-containing compositions may have inordinately long gel times, or may not gel in a very satisfactory manner. However, as described in the Examples below it has been found that the use of furfural in place of formaldehyde in the high-temperature compositions described in application Ser. No. 590,034 which use aqueous soluble sulfonated derivatives of lignin, does not greatly increase the gel times of the compositions.

It should be noted that the substitution of furfural for formaldehyde in the instant compositions and methods is not merely a matter of replacing one aldehyde by another since some aldehydes chemically much more similar to formaldehyde than furfural (for example propionaldehyde) do not give satisfactory results with the vegetable materials used in the instant compositions and methods, whereas furfural does.

The following examples are now given, though by way of illustration only, to show details of particularly preferred reagents and techniques used in the compositions and methods of the instant invention. Unless otherwise stated, all parts and proportions are by weight.

EXAMPLE 1

This Example illustrates the preparation of a sulfited derivative of a tannin extract useful for preparing first instnt compositions in conjunction with seawater.

To 52 parts of water were added 4 parts of sodium hydroxide and then 40 parts of dry powdered mimosa tannin extract. The resultant mixture was warmed to aid dissolution of the tannin and then 4 parts of sodium sulfite were added. Following the addition of the sodium sulfite, the solution was refluxed for approximately one hour and then cooled to ambient temperature.

The resultant sulfited mimosa tannin extract thus produced had a pH of 9.8–10.2 and was found to give good gellable solutions with furfural, urea-formaldehyde concentrate, hexamethylenetetramine, paraformaldehyde, formaldehyde in aqueous solution and phenol-formaldehyde resole resins when the gellable solutions were formulated using pure water.

To test the ability of the sulfited mimosa tannin extract to form gellable solutions in seawater, a synthetic seawater was prepared by dissolving 1247 g. of powdered seawater salts supplied by Marine Enterprises of Towson, Md. in 10 U.S. gallons of tap water. The composition of the resultant seawater was, according to the data given by the manufacturer of the package of salts, as follows:

|  | ppm |
|---|---|
| Aluminum | 0.06 |
| Antimony | 0.0005 |
| Argon | trace |
| Arsenic | 0.01 |
| Barium | 0.12 |
| Bicarbonate | 174 |
| Beryllium | 0.0002 |
| Bismuth | trace |
| Boron | 2.1 |
| Bromide | 62 |
| Cadmium | 0.009 |
| Calcium | 410 |
| Carbonate | 10 |
| Cerium | 0.0007 |
| Cesium | trace |
| Chromium | 0.02 |
| Chloride | 18,600 |
| Copper | 0.007 |
| Cobalt | 0.0025 |
| Dysprosium | trace |
| Erbium | trace |
| Europium | trace |
| Fluoride | 1.9 |
| Gadolinium | trace |
| Gallium | 0.0004 |
| Germanium | 0.00005 |
| Gold | trace |
| Hafnium | trace |
| Helium | trace |
| Holmium | trace |
| Indium | trace |
| Iodine | 0.03 |
| Iron | 0.03 |
| Krypton | trace |
| Lanthanum | trace |
| Lead | trace |
| Lithium | 0.24 |
| Lutetium | trace |
| Magnesium | 1,290 |
| Manganese | 0.008 |
| Mercury | 0.0007 |
| Molybdenum | 0.005 |
| Neodymium | trace |
| Neon | trace |
| Nickel | 0.009 |
| Niobium | trace |
| Nitrogen | 0.85 |
| Palladium | trace |
| Phosphorus | 0.04 |
| Potassium | 380 |
| Praeseodymium | trace |
| Protactinium | trace |
| Radium | trace |
| Radon | trace |
| Rubidium | 0.06 |
| Ruthenium | trace |
| Samarium | trace |
| Scandium | trace |
| Selenium | trace |
| Silicon | 4.5 |
| Sodium | 10,400 |
| Strontium | 12.4 |
| Sulfur (as $SO_4$) | 2,600 |
| Tantalum | trace |
| Tellurium | trace |
| Terbium | trace |
| Thalium | 0.00007 |
| Thulium | trace |
| Tin | 0.006 |
| Titanium | 0.004 |
| Tungsten | 0.004 |
| Uranium | 0.00005 |
| Vanadium | 0.0009 |
| Xenon | trace |
| Ytterbium | trace |
| Yttrium | trace |
| Zinc | 0.24 |
| Zirconium | trace |

This synthetic seawater cannot tolerate a pH higher than about 9.8–10.0, and it was found that attempting to mix the sulfited mimosa tannin extract with the synthetic seawater to produce solutions containing 5–15% total dissolved solids resulted in precipitation of insoluble material, the pH of these compositions being approximately above 8.8. Accordingly, the pH of the sulfited mimosa tannin extract solution was adjusted to 7.0±0.2 with hydrochloric acid to produce a neutralized sulfited mimosa tannin extract solution having a specific gravity of 1.26±0.02 and a viscosity of 100±50 mP.$_s$. This neutralized solution could be mixed with the synthetic seawater to produce stable mixtures having a pH of 7.2–7.8 depending on the total concentration of tannin, and no precipitation occurred in such solutions.

EXAMPLE 2

This Example illustrates variations in the process used to prepare the sulfited tannin extract used in the first instant composition and method.

The sulfitation procedure described in Example 1 was repeated with varying quantities of sodium hydroxide and the resultant sulfited mimosa tannin extracts tested for their compatibility with the synthetic seawater described in Example 1 above. The sulfited mimosa tannin extract solutions were regarded as compatible with seawater if solutions containing from 1 to 20 percent of the sulfited mimosa tannin extract in seawater remained clear and free of visible precipitation for at least 24 hours. This is a reaonable definition of compatibility from the practical point of view since such a 24 hour period of stability would be sufficient to allow injection of a gellable solution using such sulfited tannin extract into a high fluid permeability zone in the vast majority of applications. It should be noted, however, that in most cases solutions of the sulfited mimosa tannin extract in seawater are stable for periods much in excess of 24 hours.

It was found that, in order to obtain full compatibility of the sulfited mimosa tannin extract with seawater, it was necessary to use in the sulfitation procedure at least three parts of sodium hydroxide for each 40 parts of mimosa tannin extract powder. Reactions carried out with lower amounts of sodium hydroxide did not produce a sulfited tannin extract with sufficient seawater compatability.

Experiments were also conducted to determine if the sulfiting reaction could be carried out without sodium hydroxide if the reaction time was extended. A reaction mixture comprising 40 parts of spray-dried mimosa tannin extract and four parts of sodium sulfite was refluxed for a total of 28.5 hours. None of the samples of sulfited mimosa tannin extract produced by this procedure yielded 5-10% solutions compatible with seawater.

Experiments were also conducted in which the amount of sodium sulfite used in the sulfitation reaction was varied. It was found that the minimum amount of sodium sulfite to ensure seawater compatibility was approximately 3.5 parts of sodium sulfite per 40 parts of the mimosa tannin extract; sulfited mimosa tannin extracts produced using lower quantities of sodium sulfite were not seawater compatible. Furthermore, it was also established by variation of the reaction time, quantity of sodium sulfite, and quantity of sodium sulfite that the reaction time and the quantity of sodium hydroxide used in the sulfiting procedure described in Example 1 above could not be significantly reduced by increasing the amount of sodium sulfite used. In all cases, the minimum reaction time for seawater compatibility was approximately one hour.

Not surprisingly in view of the fact that mimosa tannin extract is a natural product, the properties of which vary somewhat depending upon the region where it is produced, the minimum reaction time for seawater compatibility was found to vary considerably depending upon the source of the mimosa tannin extract used. Some samples of mimosa tannin extract required reaction times longer than one hour, and in some cases as long as 3-5 hours at reflux, in order to obtain any sulfited mimosa tannin extract compatible with seawater.

The effect of variation of reaction temperature was also tested. It was found that, although seawater compatible sulfited mimosa tannin extracts could be produced at temperatures lower than the 100° C. of reflux conditions, any substantial drop in temperature produced very long reaction times which were not practicable for commercial use. It was also established that the sulfiting reaction cannot be carried out at temperatures of 20°-25° C. within one week.

It should be noted that the reaction conditions used for preparing the sulfited tannin derivatives used in the first instant compositions and methods differ significantly from the tannin sulfitation process previously described by A. Pizzi, "Sulfited Tannins for Exterior Wood Adhesives", Colloid Polymer Science, 267, 37-40 (1979). Pizzi used two parts of sodium sulfite and 40 parts of wattle tannin extract, and refluxed the reaction for four hours. This process does not produce a seawater compatible product.

EXAMPLE 3

This Example illustrates the first instant compositions which can be formulated using the sulfited mimosa tannin extract prepared in Example 1 above with various aldehyde components. Various first instant compositions were prepared at a concentration of 5% total solids content using either the neutralized sulfited mimosa tannin extract prepared as described in Example 1 above, or a spray-dried form thereof. (The term "total solids content" as used herein referes to the total weight of sulfited tannin extract and aldehyde component, but does not include any dissolved salts present as a result of formulation of the composition with brine or salt water. Thus, although designated as containing 5% total solids, some of the compositions prepared in this Example actually contained about 8% total dissolved solids since the seawater component used to make up some of these compositions added about another 3% dissolved solids.)

The 5% total solids content compositions were formulated by adding X parts of the neutralized sulfited mimosa tannin extract solution prepared in Example 1 above (which was determined to contain about 41.5% total solids) to Y parts by weight of water, in the form tap water, brine or the salt water described in Example 1 above, and Z parts of the aldehyde component were then added. Finally, the solution was stirred to ensure homogeneity. The compositions prepared were as follows:

TABLE 1

| Composition | | Weight Units | | | |
|---|---|---|---|---|---|
| | | A | B | C | D |
| 'Y' | water or brine | 87.7 | 90.4 | 88.7 | 88.1 |
| 'X' | sulfited tannin liquid concentrate | 10.3 | 7.8 | 10.7 | 8.7 |
| 'Z' | formaldehyde solution in water (37%) | 2.0 | — | — | — |
| 'Z' | furfural | — | 1.8 | — | — |
| 'Z' | hexamethylenetetramine | — | — | 0.6 | — |
| 'Z' | phenol-formaldehyde resin (44% solution in water) | — | — | — | 3.2 |

The phenol-formaldehyde resole resin used had a formaldehyde:phenol molar ratio of 2.5:1, a viscosity of approximately 30 cps., a pH of 8.3 $\propto$ 8.6 and was used an an approximately 50% solution in water. Although of course such a resin does not contain significant amounts of free formaldehyde, the methylol groups in the resin serve to cross-link the tannin in a manner similar to that of the aldehyde groups in formaldehyde.

All the compositions shown in Table 1 have about the same molar ratio of sulfited mimosa tannin extract to aldehyde or other reactive group present in the aldhedye component. Also, all the compositions shown in Table 1 above have a viscosity when first formed close to that of water.

EXAMPLE 4

This Example illustrates the variation in viscosity of the first instant compositions with time, and thus the gelling of such compositions.

The compositions used in this example were:

(1) a compositions having composition A shown in Table 1 in Example 3 above, but adjusted to 10% total solids content;

(2) a composition similar to composition (1) made up using the unneutralized sulfited mimosa tannin extract prepared in Example 1; this composition had a pH of 9.8; and (3) a composition similar to composition (1) but containing 5% total solids and made up in seawater; this composition has a pH of 7.0.

The viscosities of each of the three compositions were determined at various times after mixing using a Brookfield LVF Viscometer at 60 rpm. at a temperature of 23° C. viscosities below 200 cps. being measured with a #1 spindle and those above 200 cps. with a #2 spindle. The results are shown in FIG. 1.

As will be seen from FIG. 1, in all three cases the viscosity of the compositions remained almost unchanged for a period in excess of 80% of the gel time. Towards the end of the gel time the originally low viscosity compositions rapidly lost fluid characteristics and their viscosity increased very rapidly until they formed a gel. The form of viscosity against time curves shown in FIG. 1 is highly advantageous for use in plugging high fluid permeability segments in underground strata, since the long period for which the compositions remain of very low viscosity allows ready pumping of the solutions into deep wells and for substantial distances within underground strata until the solutions reach the desired gelation site, and once at such site the solutions gel rapidly to form strong gels.

EXAMPLE 5

This Example illustrates the variation in gel times of the first instant compositions with temperature and percentage total dissolved solids.

Figure 2:
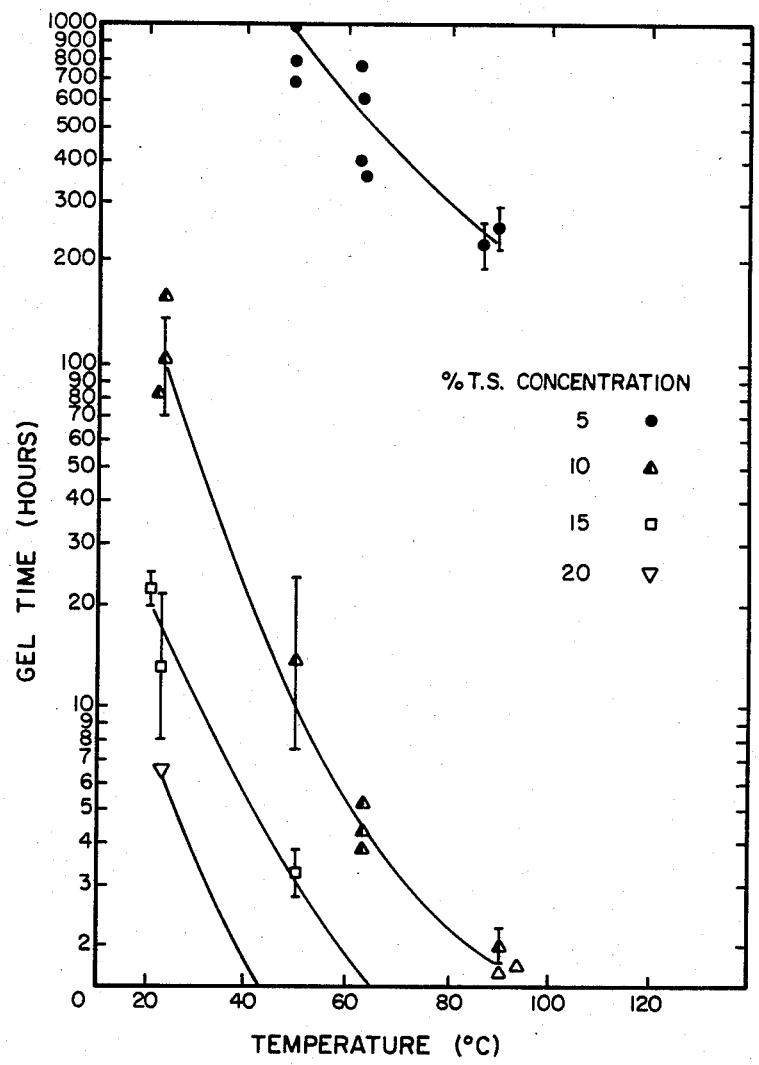
FIG. 2 shows graphs of gel times against temperature for gellable solutions containing 5, 10, 15 and 20 percent total solids in tap water at a pH of 7.0, these solutions comprising sulfited mimosa tannin extract and formaldehyde.

First instant compositions having composition A described in Example 3 above were formulated in tap water at concentrations of 5-20% total dissolved solids and the gel times of these compositions were measured using the same technique as Example 4 above over temperature ranges of 20°-90° C. The results are shown in FIG. 2. As may be seen from the data plotted in this Figure, instant compositions can readily be prepared having gel times from approximately one hour to several hundred hours over the temperature range of 20°-90° C. This range of available gel times is sufficient to meet all normal requirements for injection of the first instant compositions into high fluid permeability zones in underground strata having temperatures within this range.

EXAMPLE 6

This Example illustrates the variation of gel times of the first instant compositions formulated using seawater with temperature and percent total dissolved solids.

First instant compositions having total dissolved solids concentrations of 3.85, 4.4, 5.0, 5.5, 7.7, 8.8, 11.0, 13.2 and 16.5 were formulated in the same way as in Example 5 above except that the synthetic seawater described in Example 1 above was used instead of tap water. The gel times of the compositions were determined over the temperature range of 20°-90° C. in the same way as in Example 5 above. The results are shown in FIG. 3.

Figure 3:
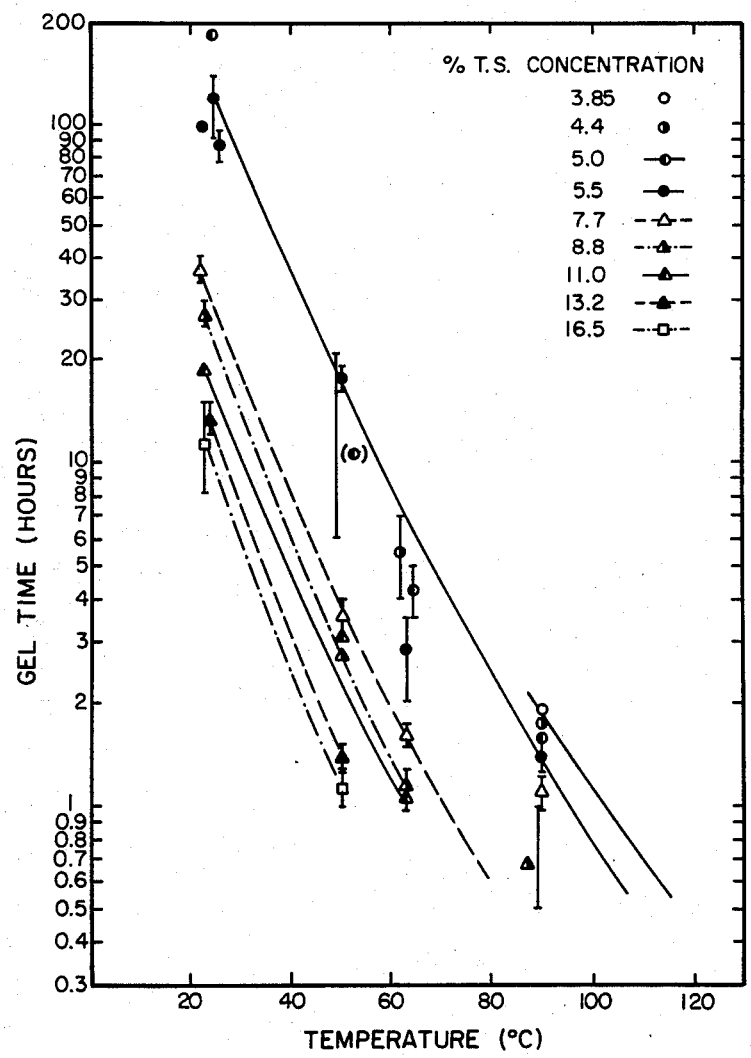
FIG. 3 shows graphs of gel times against temperature in seawater at pH 7 for gellable solutions containing various concentrations of sulfited mimosa tannin extract and formaldehyde.

As may be seen from the data plotted in FIG. 3, successful gelation of the instant compositions formulated using seawater can be obtained over the concentration range of 3.85-16.5% total dissolved solids, and the gel times of such compositions can be varied from less than 1 to over 100 hours within the temperature range of 20°-90° C. It should be noted that the gel times of compositions formulated with seawater are substantially shorter than those of corresponding compositions formulated with tap water. For example, a 5% total dissolved solids solution in tap water gelled in about 200 hours at 90° C., while a similar solution formulated using seawater gelled in approximately 1-2 hours at the same temperature.

EXAMPLE 7

This Example illustrates the effect of variations of the aldehyde component and temperature on the gel times of the first instant compositions.

Compositions having compositions A, B, C and D mentioned in Example 3 above and containing 5% total dissolved solids were formulated using seawater. The gel times of each composition over the temperature range 20°-90° C. were then determined in the same manner as in Example 4 above. The results are shown in FIG. 4.

Figure 4:
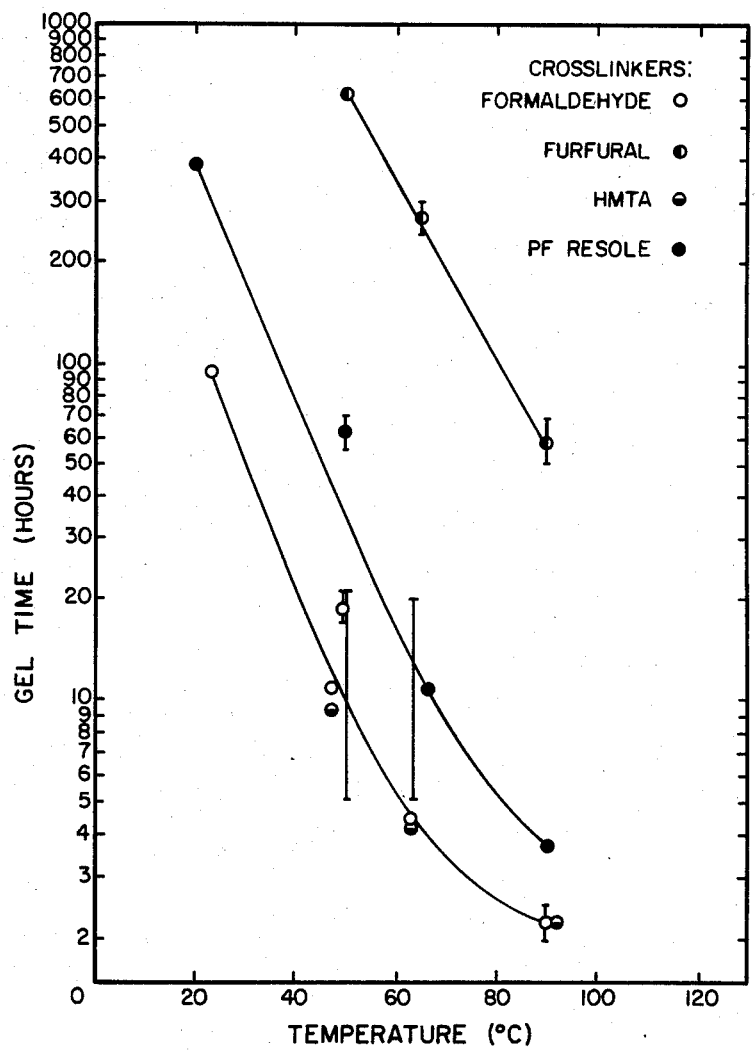
FIG. 4 shows graphs of gel times against temperature in seawater for solutions containing 5% total solids and comprising mixtures of sulfited tannin extract with formaldehyde, hexamethylenetetramine, furfural or a phenol-formaldehyde resole.

As may be seen from the data plotted in FIG. 4, the basic shape of the gel time against temperature curve is substantially the same for all the different aldehyde components. However, by varying the aldehyde component, the gel time of the composition at any given temperature within the temperature range of 20°-90° C. can be made to vary by at least an order of magnitude. The shortest gel times are obtained using aqueous formaldehyde as the aldehyde component; use of paraformaldehyde would produce substantially the same results, since paraformaldehyde dissociates very rapidly to formaldehyde in an aqueous solution. Furfural and phenol-formaldehyde resole resins produce much longer gel times. Hexamethylenetetramine gives satisfactory results at the upper end of the temperature range used, but tends to produce relatively poor quality, non-homogeneous gels at temperatures below about 60° C.; it is believed that the poor quality of these gel is caused by the relatively slow hydrolysis of hexamethylenetetramine to free formaldehyde at lower temperatures, as discussed above.

EXAMPLE 8

This Example illustrates the effect of pH on the gel times of the first instant compositions.

First instant compositions containing 10% and 15% total dissolved solids and having composition A described in Example 3 above were formulated using tap water. The pH of these solutions were adjusted over the range of 4-11 by adding small amounts of 37% aqueous hydrochloric acid or 50% aqueous sodium hydroxide solutions, and the gel times of the resultant compositions were measured at 21°-23° C. using the same technique as in Example 4 above. The results are shown in FIG. 5.

Figure 5:
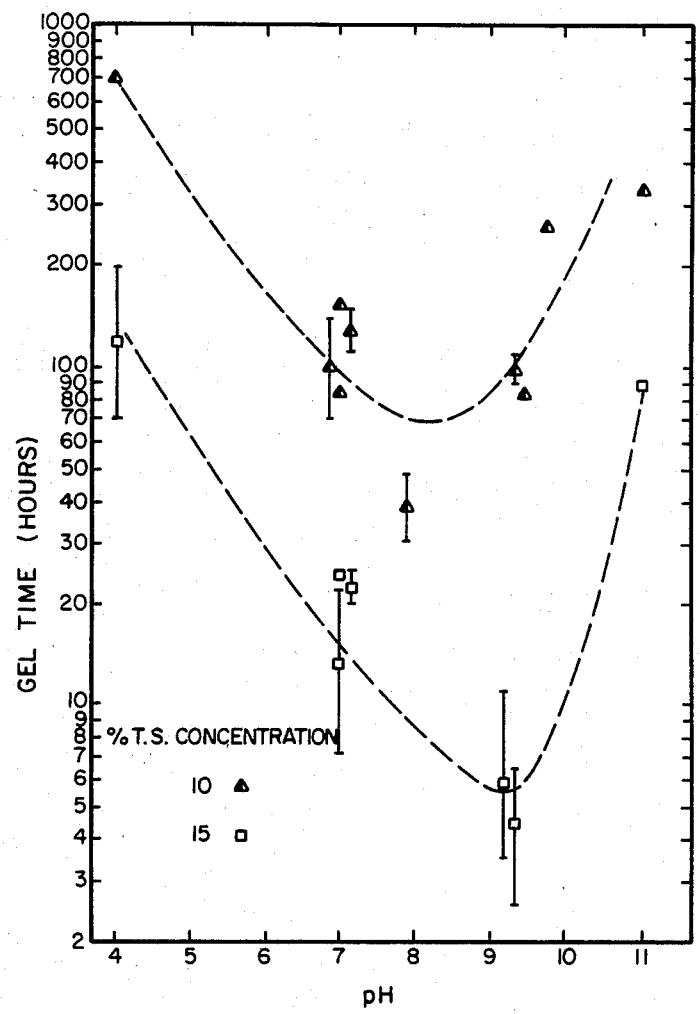
FIG. 5 shows graphs of gel times against pH at 23° C. for solutions in tap water containing 10 and 15 percent total solids and comprising sulfited mimosa tannin and formaldehyde.

From the data plotted in FIG. 5, it will be seen that the gel times of these instant compositions reached a minima at pH 8-9, the gel times incresing in both directions as the pH was adjusted from the range of 8-9. At the extremes of the pH range tested, pH's 4 and 11, the gels produced were not completely homogeneous but were sufficiently homogeneous to effect substantial reduction in the fluid permeability of high fluid permeability segments.

EXAMPLE 9

This Example illustrates the effect of pH on the gel times of first instant compositions formulated using seawater.

First instant compositions were formulated in the same way as in Example 8 above, except that separate compositions having total dissolved solids contents of 3, 5, 10 and 15 percent were prepared, and the synthetic seawater described in Example 1 above was used in place of tap water to formulate the compositions. The pH of the compositions was then varied over the range of 4–8.5 in the same way as described in Example 8 above; since precipitation of these seawater based compositions occurred above about pH 8.5, the compositions could not of course be raised to higher The gel times of the solutions at a temperature of 21°–22° C. were then determined in the same manner as in Example 4 above, and the results are shown in FIG. 6.

Figure 6:
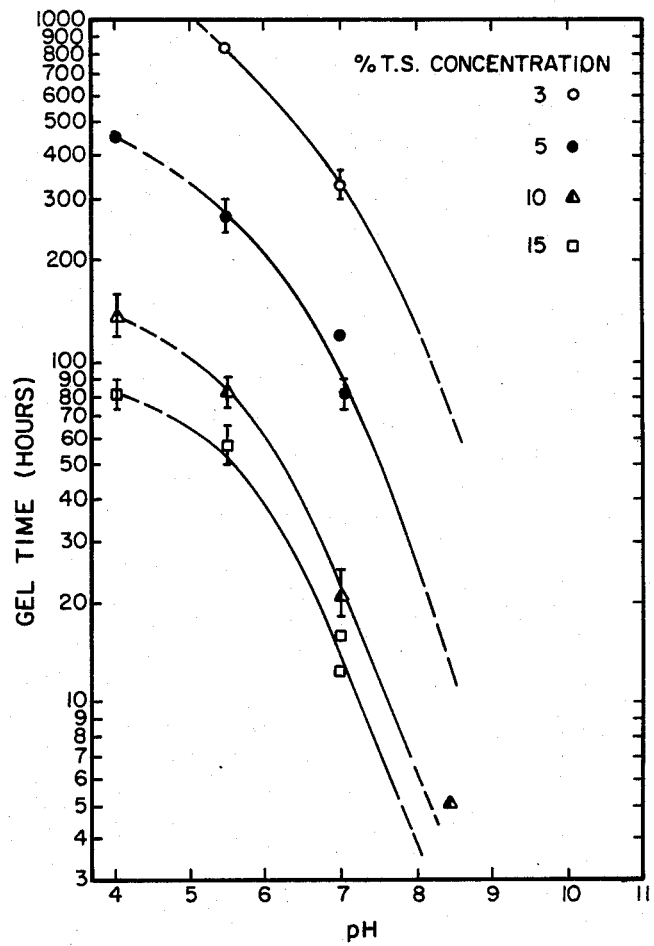
FIG. 6 shows graphs similar to those shown in FIG. 5 but taken in seawater and at total solids contents of 3, 5, 10 and 15 percent by weight.

The data plotted in FIG. 6 show that the gel times of the compositions decreased with increasing pH. The gels prepared at the extreme pH's of 4 and 8.5 were not completely homogeneous, but were sufficiently homogeneous to effect useful reductions in the permeability of high fluid permeability zones. The gels produced in the pH range of about 6–8, which is the pH range produced by addition of seawater and aqueous formaldehyde to the neutralized sulfited mimosa tannin extract, the preparation of which is described in Example 1 above, produced solid homogeneous gels.

EXAMPLE 10

This Example illustrates the effect of sodium chloride on the gel times of the first instant compositions.

First instant compositions having composition A described in Example 3 above and containing 5% total dissolved solids and 0, 1, 2, 3 and 5 percent dissolved sodium chloride were prepared. The gel times of these compositions at temperatures of 23°, 50°, 63° and 90° C. were then determined in the same way as in Example 4 above. The results are shown in FIG. 7.

Figure 7:
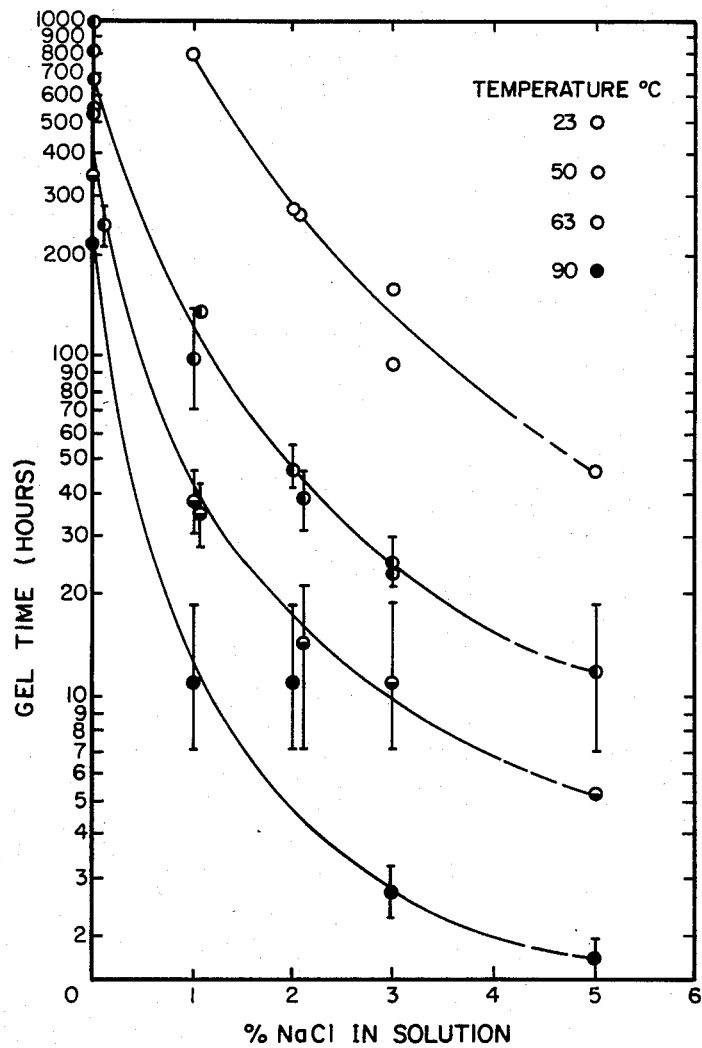
FIG. 7 shows graphs of gel times against sodium chloride concentration for solutions comprising sulfited tannin extract and formaldehyde at 5% total solids in tap water at temperatures of 20°–90° C.

The data plotted in FIG. 7 show that addition of sodium chloride causes substantial reductions in the gel time of a composition at any given temperature, the gel time typically being reduced by an order of magnitude upon increasing the sodium chloride concentration from 0 to 5 percent. When the added sodium chloride concentration did not exceed 3% by weight, which is similar to the salt content of seawater, homogeneous gels were produced. At salt concentrations of 5% non-homogeneous, cluster-like gels were produced.

Although only one total dissolved solids concentration was tested in these experiments, the behavior of solutions having different total dissolved solids contents may be expected to be similar.

EXAMPLE 11

This Example illustrates the use of the first instant compositions to reduce the high fluid permeability of water-washed Athabasca tar sands, such as are often encountered in Canadian oil-bearing strata.

Experimental models of high fluid permeability zones in underground strata were prepared by water washing Athabasca tar sand until the residual tar saturation was reduced to approximately 2.6%, and packing this washed sand into stainless steel tubes having an internal diameter of 9.5 mm (3/8 of an inch) and a length of 152 mm (6 inches). The packed sand was compressed in the tube under a pressure of 2800–3100 Knw.m$^{-2}$(4000–4500 psi.) and the permeability of the packed sand to seawater was measured. This permeability was typically 1.5–3 Darcies. A sand-packed tube prepared in this manner was then injected with 3.0 cm 3. (approximately one pore volume) of a first instant composition having composition A described in Example 3 above, having a total dissolved solids content of 5% and formulated using seawater. The injection of this gellable composition was followed by an after-flush of 0.5 cm$^3$ of seawater, and the composition was allowed to gel within the tubes by storing the tube at 50° C. for 17 hours. The permeability of the tube to seawater was then determined over the temperature range of 20°–170° C.; the resultant permeability against temperature curve is designated curve 1 in FIG. 8.

Figure 8:
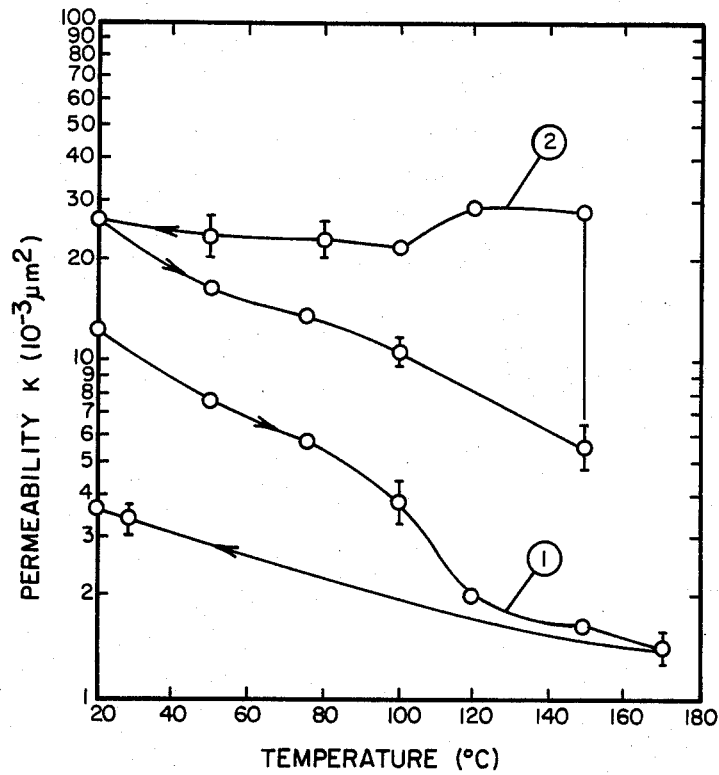
FIG. 8 shows graphs of residual water permeability against temperature for water-washed Athabasca tar sand, the permeability of which was reduced with an instant composition comprising sulfited tannin and formaldehyde and having a total solids of 5%.

The tube was then stored for 16 hours at 250° C. and the permeability redetermined over the temperature range of 20°–140° C.; the resultant permeability against temperature curve is designated curve 2 in FIG. 8.

From the data plotted in FIG. 8 it will be seen that the initial permeability following gelation varied over the range of approximately 2–14 md, which was less than 1% of the permeability of the packed sand prior to injection of the gelable composition thereinto. After the 16 hour storage at 250° C., the permeability of the gel increased by a factor of approximately two, but was still only about 2% of the permeability of the packed sand prior to injection of the gelable composition.

It was shown, in separate experiments, that extended exposure of gels produced by the first instant compositions to temperatures of about 250°–275° C. did not result in significant deterioration of the gels.

EXAMPLE 12

This Example illustrates the preparation of a sulfited quebracho tannin extract which can be used in the first instant compositions and methods.

An aqueous solution of sodium sulfite was prepared by adding 4 parts of sodium sulfite to 56 parts of water and heating the resultant solution to 50° C. 40 parts of quebracho tannin extract were added and the solution was refluxed for approximately 5 hours. It was found that refluxing for 5 hours produced a sulfited quebracho tannin extract solution which was seawater compatible, whereas shorter reflux times produced a product which was not fully seawater compatible.

The sulfited quebracho tannin extract solution produced after 5 hours refluxing had the pH of approximately 8.4 and could be used with all the aldehyde components to produce first instant compositions in water, brine or seawater.

EXAMPLE 13

This Example demonstrates the variations in gel time of the first instant compositions which can be effected by varying the sulfited tannin extract component of the compositions.

First instant compositions containing 5, 10 and 15% total dissolved solids were formulated in accordance with composition A described in Example 3 above, and with a corresponding composition in which the same quantity of the sulfited quebracho tannin extract produced in Example 12 was substituted for the sulfited mimosa tannin extract. In both cases, solutions were prepared using both tap water and seawater. The gel times for the compositions were then determined at 23° C. using the same technique as in Example 4 above. The results are shown in FIG. 9.

Figure 9:
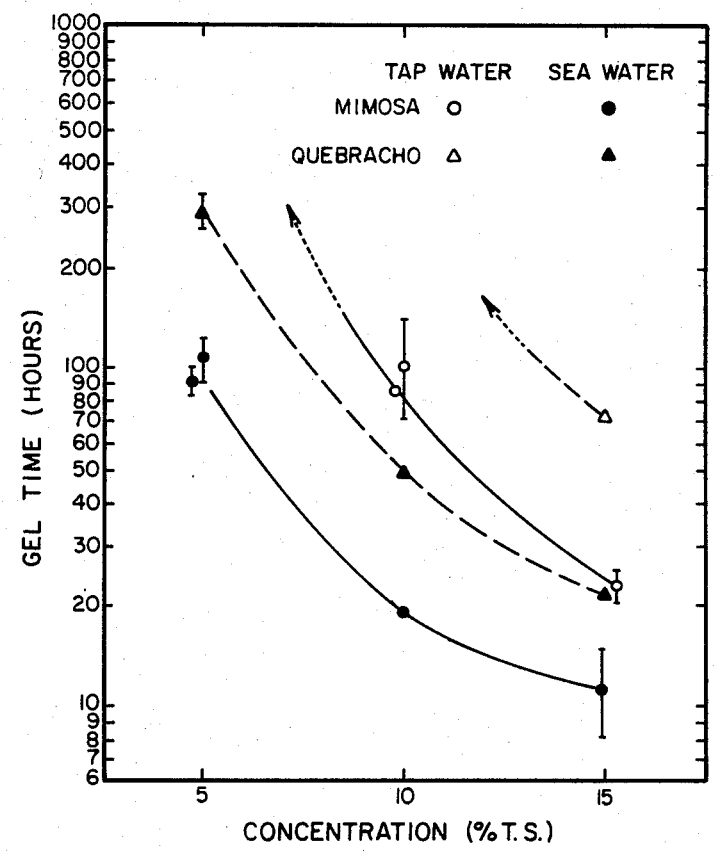
FIG. 9 shows graphs of gel time against total solids concentration for instant compositions comprising either sulfited mimosa tannin or sulfited quebracho tannin extract and formaldehyde at total solids contents of 5–15 percent in both seawater and tap water at pH 7.

From the data plotted in FIG. 9, it will be seen that both the sulfited mimosa tannin extract and the sulfited quebracho tannin extract produced solutions having usable gel times with both tap water and seawater. The gel times of the compositions containing the sulfited quebracho tannin extract were higher than those of the corresponding compositions containing the sulfited mimosa tannin extract by a factor of about 2–3.

EXAMPLE 14

This example illustrates the use of urea-formaldehyde concentrate in the first instant compositions.

A sulfited mimosa tannin extract was prepared and neutralized to pH 7 in the same manner as in Example 1 above; the resultant product was found to contain 37% sulfited mimosa tannnin extract. 27.3 parts by weight of this sulfited tannin extract (equivalent to 10.1 parts by weight of the tannin itself) were then mixed with 2.5 parts by weight of a urea-formaldehyde concentrate containing 59% by weight formaldehyde and 26% by weight urea, and with 115.4 parts by weight of the synthetic seawater described above, and the resultant concentrated composition diluted to produce samples containing 10, 7, 5 and 3 percent total dissolved solids. The gel times of the resultant diluted compositions were then measured at temperatures from 23° to 200° C. The results are shown in Table 2 below.

TABLE 2

| Sample | % Total dissolved solids | Temp °C. | Gel Time (hrs) |
|---|---|---|---|
| 1 | 10 | 23 | 96-120 |
| 2 | 10 | 65 | 5 |
| 3 | 10 | 95 | 1-2 |
| 4 | 7 | 65 | 5-70 |
| 5 | 7 | 95 | 4 |
| 6 | 5 | 95 | 5-16 |
| 7 | 5 | 150 | <2 |
| 8 | 5 | 177 | <3 |
| 9 | 3 | 150 | <2 |
| 10 | 3 | 200 | <2 |

The foregoing results show that first instant compositions containing urea-formaldehyde concentrate as the source of formaldehyde and having useful gel times up to at least about 150° C. can be produced. Good smooth gels were produced in all the experiments shown in Table 2, except that sample 10 produced a cluster-type gel, presumably in view of the high temperature involved. Attempts to use similar 1% total dissolved solids compositions at 150° and 200° C. produced gelling in less than two hours and the formation of cluster type gels.

EXAMPLE 15

This example illustrates the ability of the first instant compositions to effect a greater proportional reduction in water permeability than oil permeability in an experimental model of a high fluid permeability zone.

A first instant composition was formulated having the same composition as composition A described in Example 3 above, except that the formaldehyde solution was replaced by a urea-formaldehyde concentrate containing 59% by weight of formaldehyde and 26% by weight of urea, the amount of the concentrate being adjusted so that the amount of formaldehyde present was the same as in Example 3.

Experimental models of high fluid permeability zones in underground strata were then prepared in the same manner as in Example 11 above by packing stainless steel tubes with sand. However, in this experiment the tubes had a diameter of 13 mm. (0.5 inch), and a mixture of equal amounts of sand blasting sand and silica flour (ground quartz) was substituted for the Athabasca tar sand; Athabasca tar sand is not suitable for use in this experiment because, as described below, this experiment requires flooding with a hydrocarbon oil and such flooding of Athabasca tar sand dissolves out residual tar thereby, introducing errors into the experiment.

The sand-packed tube was first flooded with the synthetic seawater described above, and its initial permeability recorded. This initial permeability was found to be 230 mD. The flooding medium was then changed to a commercially-available like paraffinic oil (Sunpar 107H) and the permeability to this oil at residual water saturation found to be 550 mD. Finally, the flooding fluid was again changed to seawater and the permeability to water and residual oil saturation was found to be 120 mD.

Next, the tube was injected with 1 pore volume of the above-described first instant composition, followed by a small after-flush of seawater. Both ends of the tube were capped and the tube was left at 150° C. for 16 hours to enable the composition to gel. After gelling, the tube was flooded with seawater and the permeability to seawater at residual oil saturation found to be 9 mD. The flooding medium was then changed to oil and the permeability to oil at residual water saturation found to be 150 mD. Finally, the flooding fluid was changed back to seawater and the permeability to seawater at the new residual oil saturation found to be 8 mD.

These experimental results show that the permeability to water at residual oil saturation dropped 93% after treatment of the sand with the first instant composition, whereas the permeability to oil at residual water saturation dropped only 73%. Thus, treatment of the sand with the first instant composition resulted in an improvement of the oil:water permeability ratio from 4–5 to approximately 17 (all the above permeability measurements are subject to an error of about 10%, so that the exact values for the permeability ratio are somewhat suspect but the values do shown an increase in permeability ratio far too large to be the result of experimental variation).

EXAMPLE 16

This example illustrates the gel times of instant compositions similar to the high temperature compositions described in the aforementioned copending application Ser. No. 441,430 but using furfural instead of formaldehyde.

Instant compositions were formulated using the spray-dried lignosulfonate sold commercially as Tembind F, and furfural, both materials being used in the commercially-available form. Tap water was used to make up the formulations. Compositions containing 5, 7 and 10% total dissolved solids were formulated and their gel times determined at temperatures of 95°–200° C. The results are shown in Table 3 below:

TABLE 3

| Sample # | Ligno-sulfonate | Fur-fural | Water | % total dissolved solids | Temp. (°C.) | Gel time (hrs) |
|---|---|---|---|---|---|---|
| 1 | 2.5 | 2.5 | 95 | 5 | 150 | 44–52 |
| 2 | " | " | " | 5 | 200 | <5 |
| 3 | 3.5 | 3.5 | 93 | 7 | 150 | 29.5–44 |
| 4 | " | " | " | 7 | 200 | <5 |
| 5 | 5 | 5 | 90 | 10 | 95 | >305 |
| 6 | " | " | " | " | 150 | 21.5–28–5 |
| 7 | " | " | " | " | 200 | <5 |

The gel times shown in Table 3 above are not substantially greater than those of corresponding compositions formulated using formaldehyde, so that it may be concluded that the use of furfural instead of formaldehyde does not greatly retard the gelling of the compositions. In all cases strong homogeneous gels without any syneresis were produced, and the foregoing results shows that compositions based on lignosulfonates and furfural can be produced having useful gel times over the temperature range of approximately 100°–200° C.

It will be apparent to those skilled in the art that numerous changes and modifications can be made in the preferred embodiments of the invention described above without departing from the scope of the invention. Accordingly, the whole of the foregoing description is to be construed in an illustrative and not in a limitative sense, the scope of the invention being defined solely by the appended claims.

We claim:

1. A composition for use in reducing the permeability of high permeability segments of underground strata, said composition being an aqueous gelable solution having a pH of at least about 4 and consisting essentially of a sulfonate derivative of a tannin extract and an aldehyde component selected from the group consisting of furfural, ureaformaldehyde concentrate, hexamethylenetetramine, paraformaldehyde, formaldehyde in aqueous solution and phenol-formaldehyde resole resin, the weight ratio of said sulfonate derivative to said aldehyde component is from about 1.5:1 to about 7.5:1 based on the aldehyde in said aldehyde component available for reacting with said sulfonate derivative, the total weight of said sulfonate derivative and aldehyde component being from about 1 to about 30 percent by weight of said solution and the viscosity of the composition is between 1 and 30 mPa.s when first formed.

2. A composition according to claim 1 having a pH of about 4 to about 11.

3. A composition according to claim 1 wherein said sulfonate tannin extract is a sulfonate derivative of mimosa tannin extract or quebracho tannin extract.

4. A composition according to claim 3 wherein said sulfonate derivative is prepared by treating mimosa tannin solution or quebracho tannin solution with an alkali metal sulfite in a ratio of from about 5 to about 20 parts by weight of said sulfite per 100 parts by weight of said tannin solution on a dry basis.

5. A composition according to claim 1 wherein said aldehyde component comprises paraformaldehyde.

6. A composition according to claim 5 wherein said solution comprises from about 5 to about 20 parts by weight of paraformaldehyde per 100 parts by weight of said sulfonate tannin extract on a dry basis.

7. A composition according to claim 1 wherein said aldehyde component comprises furfural in an amount of from about 40 to about 60 parts by weight per 100 parts by weight of said sulfonate tannin extract on a dry basis.

8. A composition according to claim 1 wherein said solution further comprises an alkali.

9. A composition according to claim 8 wherein said alkali comprises sodium or potassium hydroxide present in an amount of from about 5 to about 20 parts by weight per 100 parts by weight of said sulfonate tannin extract on a dry basis.

10. A composition according to claim 1 wherein said solution further comprises not more than about 0.2 percent by weight of divalent or multivalent cations which form insoluble hydroxides in solution at an alkaline pH.

11. A composition according to claim 10 which is produced by dissolving said sulfonate tannin extract and said aldehyde component in sea water.

12. A composition according to claim 10 wherein said solution has a viscosity, when first formed, of from about 1 to about 30 mPa.s at 23° C.

13. A composition for use in decreasing the permeability of high permeability segments of strata, said composition being an aqueous gelable composition consisting essentially of furfural and a vegetable material capable of being gelled in aqueous solution by furfural, said vegetable material being selected from the group consisting of tannin extracts, sulfonate derivatives of tannin extracts, catechins, lignin extracts derived as by-products of the separation of cellulosics from ligninous materia in the pulping process for manufacturing paper products, and soluble sulfonated derivatives of lignin derived as by-products of the pulp and paper industry separation of ligninous material from the cellulosics used in the manufacture of paper products.

14. A composition according to claim 13 wherein said vegetable material comprises a tannin extract or a catechin, said composition further comprising an alkaline material and being in the form of an aqueous solution having a pH of at least about 9.5, the total active solids content of said solution being from about 1 to about 33% by weight.

15. A composition according to claim 13 wherein said vegetable material comprises a lignin extract derived as a by-product of the separation of cellulosics from lignious material in the pulping process for manufacturing paper products, said composition further comprising an alkaline material and being in the form of an aqueous solution having a pH of at least about 9.0, the total weight of said alkaline material, lignin extract and furfural being from about 5 to about 30 percent by weight of said solution.

16. A composition according to claim 13, wherein said vegetable material comprises an aqueous soluble sulfonated derivative of lignin derived as a by-product of the pulp and paper industry separation of ligninous material from the cellulosics used in the manufacture of paper products, said composition being in the form of an aqueous solution having a pH of about 2 to about 11 wherein the total weight of said sulfonated derivative and said furfural is from about 3 to about 15 percent by weight of said solution.

* * * * *